Jan. 31, 1950 R. C. WALLACE 2,495,993
TRANSMISSION AND THROTTLE CONTROLLING DEVICE
Filed June 10, 1946 5 Sheets-Sheet 3
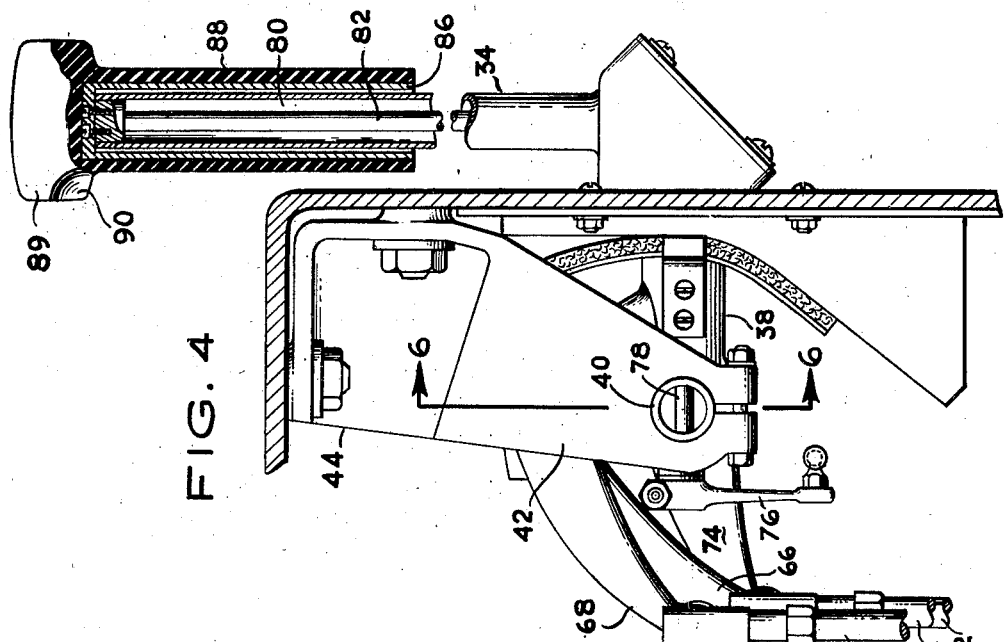
FIG. 4
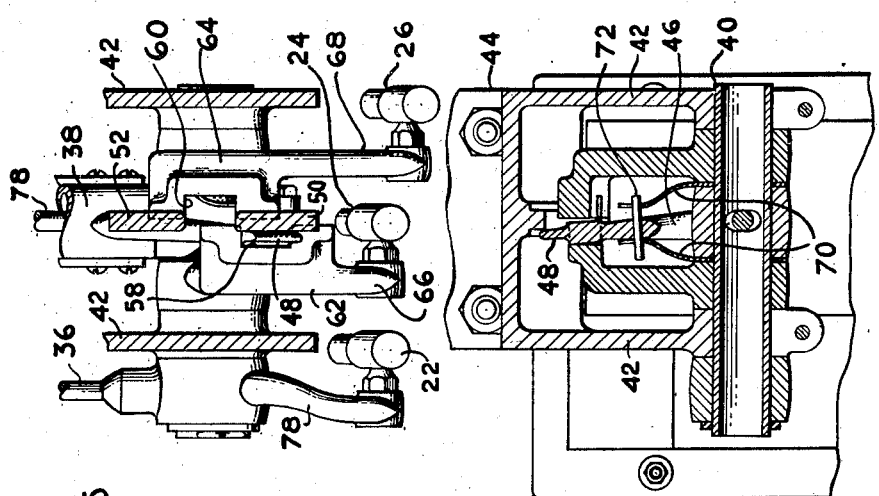
FIG. 5
FIG. 6
INVENTOR
ROBERT C. WALLACE
BY
Toulmin & Toulmin
ATTORNEYS INVENTOR
ROBERT C. WALLACE
BY
Toulmin & Toulmin
ATTORNEY Patented Jan. 31, 1950

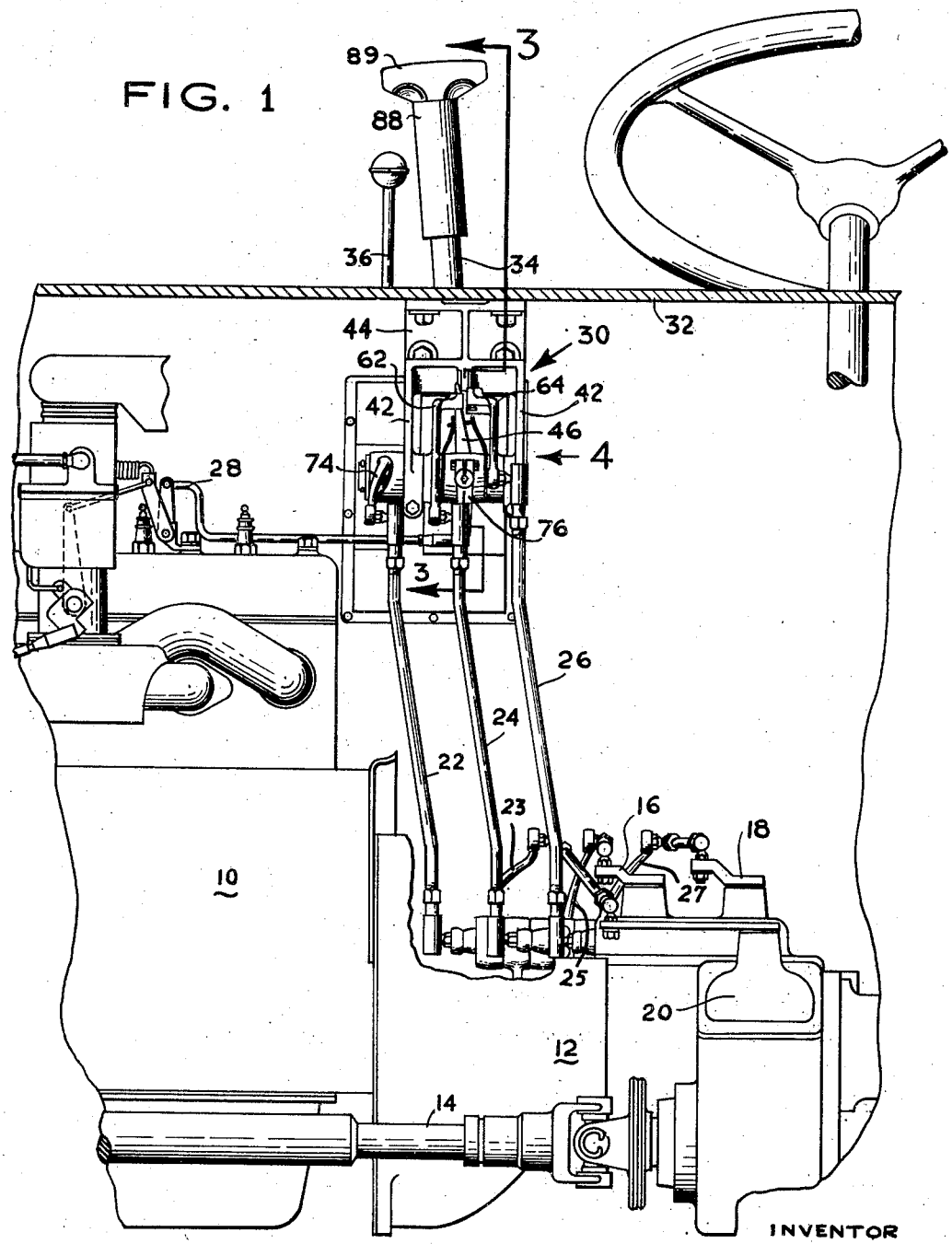

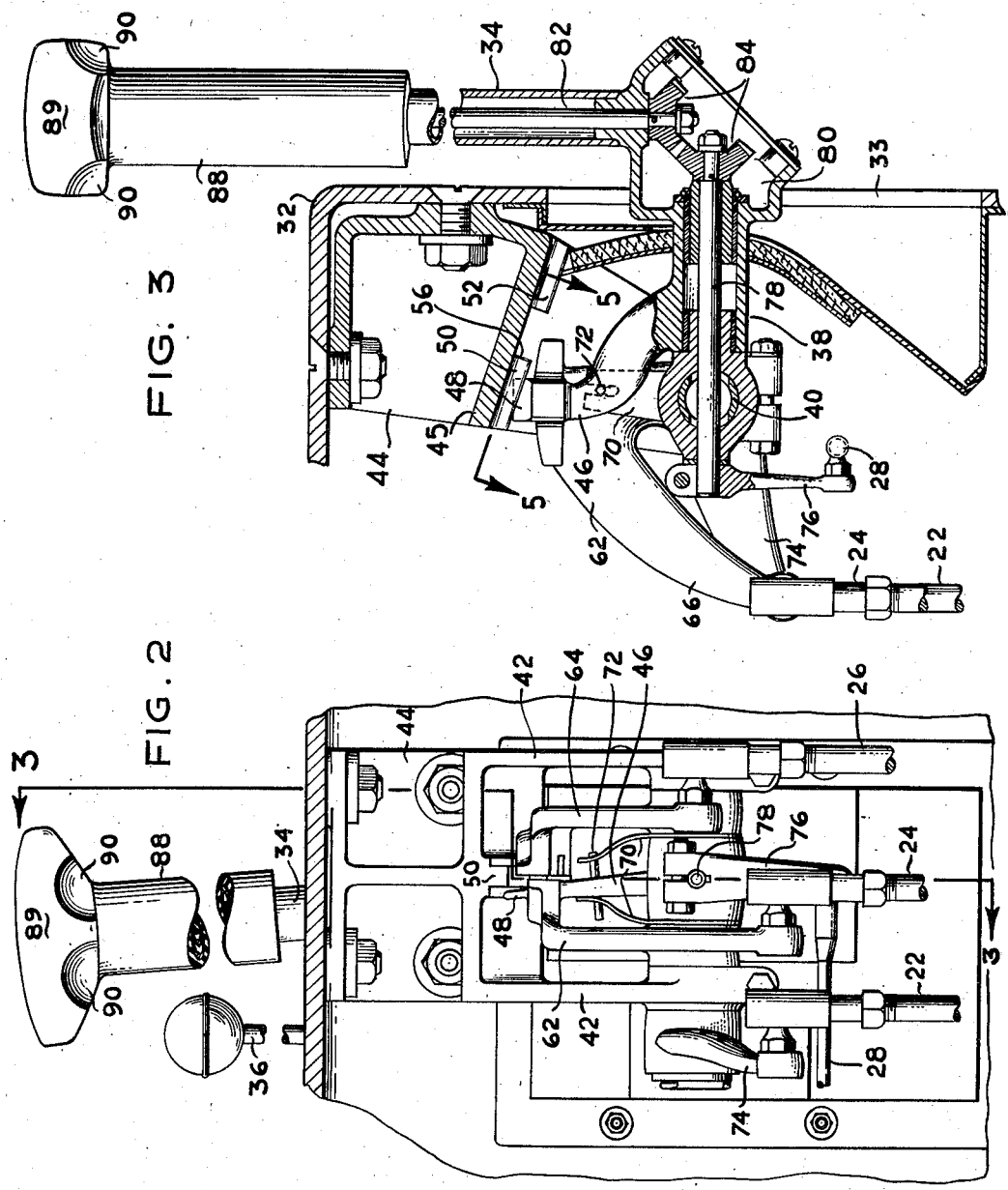

2,495,993

UNITED STATES PATENT OFFICE 2,495,993

TRANSMISSION AND THROTTLE
CONTROLLING DEVICE

Robert C. Wallace, Indianapolis, Ind., assignor to Marmon-Herrington Company, Inc., Indianapolis, Ind., a corporation of Indiana Application June 10, 1946, Serial No. 675,679

11 Claims. (Cl. 74—472)

This invention relates to control mechanisms, and particularly to control mechanisms for the transmission and throttle in motor vehicles of the stand-up drive type.

The object of this invention is to provide an improved mechanism for controlling the throttle and transmission in a stand-up drive vehicle which is more readily manipulated by the said operator.

Another object is to provide a unitary throttle and transmission control mechanism for a vehicle of the stand-up drive type.

Still another object is to provide in combination with a transmission control lever of a vehicle, a throttle control mechanism especially adapted for simultaneous manipulation with the said transmission control lever.

Still another object is the provision of an improved arrangement of engine and controls therefor in a vehicle such that the greatest economy of space results.

These and other objects and advantages will become more apparent upon reference to the following description and the accompanying drawings in which:

Figure 1 is a transverse section in front of the operator's position looking to the rear and showing the general arrangement of the motor, transmission and control mechanism of this invention in relation to the operator's driving position;

Figure 2 is an enlarged view of the mechanism with which this invention is concerned;

Figure 3 is a vertical section indicated by the lines 3—3 on Figures 1 and 2;

Figure 4 is a side elevation of the mechanism and is indicated by the arrow 4 in Figure 1;

Figure 5 is a plan section showing a portion of the transmission control mechanism and is indicated by the line 5—5 on Figure 3;

Figure 6 is a vertical section through a portion of the transmission control mechanism and is indicated by the line 6—6 on Figure 4.

Figure 7:
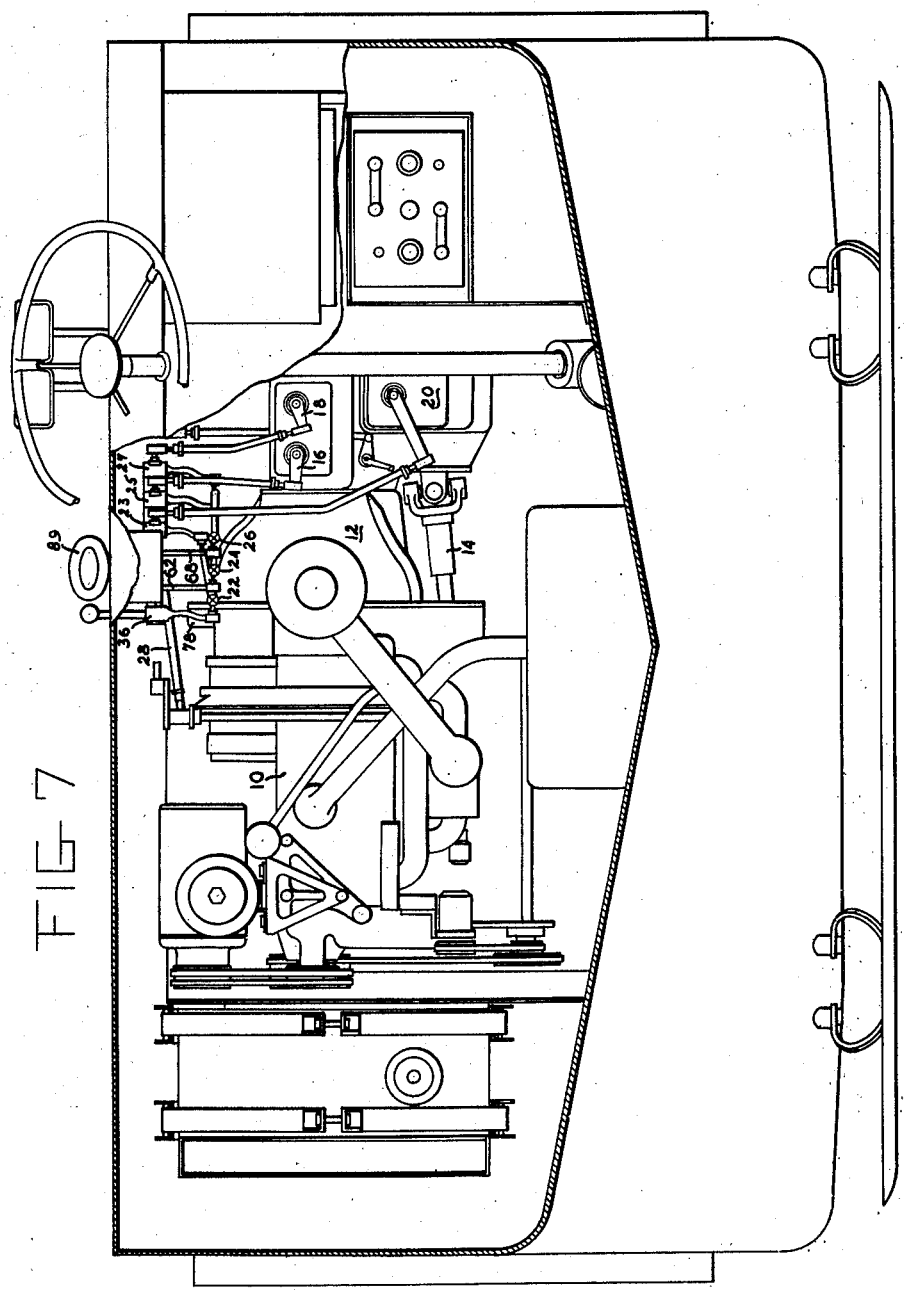
Figures 7 and 8 are plan and side views, respectively, of an engine and the controls therefor arranged in a vehicle.

Referring to the drawings, 10 indicates the power plant of the vehicle which, in the type of vehicle with which this invention deals, is generally carried transversely in the forward end immediately in front of the operator's position. The engine 10 drives through a transmission generally indicated at 12 and delivers power to a drive shaft 14 which is connected with the driven wheels of the vehicle. The transmission 12 includes a clutch, not shown, but which is positioned adjacent the floor to be manipulated by the operator's foot.

The transmission 12 also includes the shiftable levers 16 and 18 which provide for various speeds of operation and direction of travel of the vehicle in the usual manner. A transmission of this type also includes, usually, a mechanism generally indicated at 20 by means of which high and low speed ranges may be selected for obtaining the most efficient operation of the vehicle under all conditions.

The mechanism at 20 has connected therewith a linkage system identified by the reference numeral 22 while the levers at 16 and 18 have connected therewith the linkages indicated at 24 and 26, respectively. The linkage systems 22, 24 and 26 include the pivoted levers or bell cranks 23, 25 and 27, respectively, which may be journalled on a suitable means on the engine frame as shown in Figure 7.

The power plant or engine 10 has connected therewith a throttle lever 28 by means of which the speed of the engine is adjusted in the usual manner. The throttle lever 28 and the linkages 22, 24 and 26 all lead to a centralized control mechanism generally indicated by the reference numeral 30 which is secured to a panel 32 immediately in front of the operator's position. The panel 32 is suitably apertured, as indicated at 33 in Figure 3, to permit the adjusting levers of the control mechanism 30 to pass therethrough to the operator's position. These levers include a first lever at 34 which controls the linkages 24 and 26 and a second lever 36 which controls the linkage 22.

The manner in which the lever 34 controls the linkages 24 and 26 is best shown in Figures 2 through 6 wherein it will be seen that the lever 34 is an L-shaped device which includes the horizontally extending portion 38 that is journalled on the shaft or sleeve 40 which extends between the depending side members 42 of the bracket 44 of the control mechanism 30. The portion 38 also includes an upstanding arm 46 which has a tongue thereon as at 48 which is adapted for engaging either side of the depending ribs 50 and 52 which are carried on the wall 45 of the bracket 44. By oscillation of the lever 34 in a plane perpendicular to the axis of the shaft 40, the arm 46 may be oscillated on either side of the ribs 50 and 52. When the lever 34 is adjusted to bring the tongue 48 into alignment with the aperture 56 between the said ribs, then the said lever may be oscillated about the axis of the portion 38 thereby to position the tongue 48 on one side or the other of the ribs 50, 52.

The upper end of the arm 46 immediately beneath the tongue 48 is shaped to be received into the recesses 58 and 60 of the arms 62 and 64, respectively. These arms are pivoted on the shaft 40 and comprise the forwardly extending portions 66 and 68, respectively, which receive the upper ends of the linkages 24 and 26, respectively. The arm 46 is continuously urged toward its center or neutral position by a pair of leaf springs 70 which encircle the shaft 40 which have their upper ends slotted to receive an aligning pin 72 extending through the arm 46. The arm 46 and lever 34 are thus continuously urged toward the ribs 50, 52 so that the shifting of the arm 46 from one side thereof to the other through the aperture 58 is greatly facilitated.

The upper end of the linkage 22 is connected to the end of an arm 74 which is pivoted on the shaft 40 on the outside of one of the walls 42 of the bracket 44. The arm 74 receives the lower end of a lever 36 which is oscillatable in a plane perpendicular to the axis of the shaft 40 for manipulating the linkage 22 thereby to select between high and low speed ranges.

The throttle lever 28 is pivoted to the end of a lever 76 which is clamped on the end of a shaft 78 that extends horizontally through the shaft 40. The shaft 78 is journalled in the horizontal portion 38 of the lever 34 and terminates in the recess 80 which is integral with the lever 34. Extending vertically downwardly through the lever 34 is a second shaft 82 which also terminates within the recess 80 and the two shafts 78 and 82 are drivingly connected by the bevel gears 84. Referring to Figure 4, it will be noted that the shaft 82 extends vertically upwardly through the lever 34 and is riveted, welded, or otherwise suitably rigidly secured to an internal member 86 and an external sleeve 88 which extends downwardly around the lever 34.

It will be apparent that rotation of the sleeve 88 will be effective to oscillate the lever 76 and therethrough to adjust the throttle of the engine. It will also be apparent that the shifting of the lever 34 can be accomplished without materially effecting the throttle setting. In order to provide the throttle adjusting mechanism with a means more easily grasped by the operator, there is the rubber-like sleeve 88 which closely fits over the depending sleeve 86 and terminates in the substantially ellipsoidal upper end portion 88 which may be notched as at 90 to provide a more positive gripping means.

The axis of the portion 88 is normally transversely disposed and the rotation of the shaft 80 is about 90° so that the portion 88 is thus readily graspable by the operator in all positions of the lever 34 and in all positions of adjustment of the throttle. The sleeve portion of the member 88 is of sufficient length and size to provide a second means which may be grasped by the operator according to his preference, but it will be apparent that the particularly shaped upper end is the best adapted both for shifting of the transmission control lever and the adjustment of the throttle.

Thus, it will be seen that the present invention provides a unitary and centralized mechanism for complete control of the transmission and throttle and, at all times, the operator has at least one hand free to manipulate the steering wheel. By this arrangement, the vehicle may be driven for greater periods of time with less fatigue and with a greater margin of safety.

Figure 8:
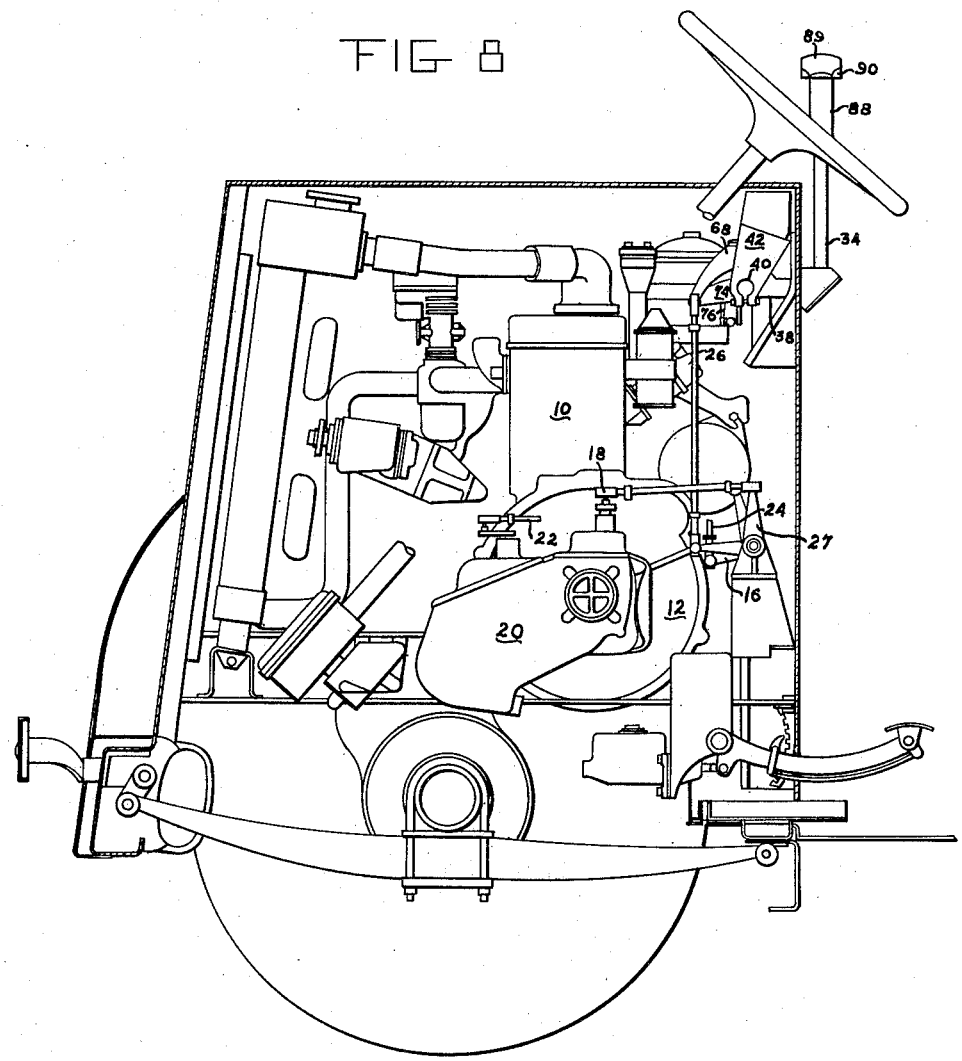

In Figures 7 and 8 there are shown general views of an engine and control means therefor arranged according to this invention. These views illustrate a complete traction unit adapted for being secured to a load carried such as a truck body.

In these views it will be noted that the control means for the engine throttle and transmission are substantially centralized and that they are connected with the said throttle and transmission by levers pivoted to the vehicle frame and to the engine by links which are substantially coplanar. It will be apparent that this arrangement is compact and located to be conveniently manipulated by the vehicle operator. By employing an arrangement of this type the engine can be located in the vehicle in the most convenient manner and the control means connected therewith according to the construction illustrated, and the minimum amount of space is required for a complete installation.

It will be understood that this invention is susceptible to modification in order to adapt it to different usages and conditions and, accordingly, it is desired to comprehend such modifications within this invention as may fall within the scope of the appended claims.

I claim:

1. In combination in a control mechanism for a power plant having an engine; of a transmission control lever pivoted to move about two coplanar axes; a throttle control mechanism for said engine; and means of adjusting said throttle control mechanism comprising shafting extending through said lever and including a part which is co-axial with one of said axes; a hand grip member carried by said transmission control lever for shifting the same and connected with said shafting; and means for connecting said shafting with the throttle of the engine.

2. In combination; an engine having a throttle and a transmission connected with said engine and having a shiftable speed change mechanism; a unified control means for said speed change mechanism and said throttle comprising a lever pivoted to be shifted about two co-planar axes into a plurality of positions and connected with said speed change mechanism; rotatable shafting extending axially through said shiftable lever and at least in part co-axial with one of said axes, said shafting being adjustable independently of said lever and being connected with said throttle for effecting adjustment thereof independently of the movements of said lever, and a single graspable portion on the end of said lever for effecting movement of both said lever and said member.

3. In combination with a throttle controlled engine and a transmission through which said engine drives; a hollow lever connected to adjust said transmission and shiftable about two axes; mechanism connected with the throttle of said engine for adjusting the speed thereof and including shafting having one portion extending axially through said lever and another portion extending along at least one of said axes to be connected with said mechanism; and a member carried on the end of said shafting at the end of said lever and graspable for both shifting said lever and for rotating said shafting, the arrangement being such that the said shifting and the said rotation can be carried on entirely independently.

4. In combination with a throttle controlled engine and a transmission through which said engine drives; an L-shaped lever connected to adjust said transmission and shiftable about two angularly disposed axes; a mechanism connected with the throttle of said engine for adjusting the speed thereof including shafting having one part extending axially through one leg of said lever and another part extending along at least one of said axes and connected with said mechanism; a sleeve connected with said shafting and enclosing the end of said one leg of said lever;

and a member carried by said sleeve and having a graspable portion at the upper end thereof whereby said graspable portion may be rotated for adjusting said throttle, or said transmission control lever may be shifted thereby.

5. In an automotive vehicle of the stand-up drive type having a throttle controlled engine and an adjustable transmission through which said engine drives, the combination with said engine throttle and said adjustable transmission of a centralized control mechanism therefor comprising; a substantially vertical lever pivoted at its lower end for movement about two angularly disposed co-planar axes and connected to adjust said transmission; a member carried on the upper end of said lever and being shaped to be grasped by the vehicle operator's hand for effecting shifting movements of said lever; and shafting extending axially through said lever and connected with said member to be actuated thereby when said member is rotated, and also being connected with said throttle to effect adjustments thereof when said member is rotated, said shafting including a portion extending along at least one of said axes of rotation of said member.

6. In a vehicle of the stand-up drive type having a throttle controlled engine and an adjustable transmission; a centralized control mechanism carried by said vehicle at the operator's position and comprising a frame adapted for being secured to the vehicle frame; lever means pivoted in said frame for movements about two angularly related axes and having connections with said transmission for effecting adjustments thereof; adjusting means connected with the throttle of said engine; and a single means for adjusting both said throttle and said lever means comprising, a hand piece on the end of said lever means for shifting said lever means about its axis; and shafting extending through said lever means and connected at one end with said hand piece and at its other end with said mechanism for adjusting the throttle for relative rotation of said hand piece on said lever, said shafting extending along one of said axes of rotation of said lever.

7. In a vehicle of the stand-up drive type having a throttle controlled engine and an adjustable transmission; a centralized control mechanism for said engine and transmission comprising a frame to be secured at the operator's position in said vehicle; an up-standing lever pivoted in said frame for movement about two angularly disposed axes and having means extending to said transmission for the adjustment thereof; mechanism connected with the throttle of said engine; means of adjusting said mechanism comprising shafting extending through said lever; a sleeve encircling the upper end of said lever and being rigidly connected with said shafting; and means of rotating said shafting to adjust said throttle or pivoting said lever to adjust said transmission comprising a rubber-like cylindrical member surrounding said sleeve and terminating in its upper end in a hand piece adapted for being received in the operator's palm-down hand, said shafting extending along one of said axes of rotation of said lever.

8. In a vehicle; a transversely disposed engine mounted in a compartment ahead of the driver's cab and having a throttle and an adjustable transmission; a centralized control means for said throttle and transmission mounted in the driver's cab; and means connecting said control means with said transmission comprising a first group of rods extending downwardly from said control means, a second group of rods extending horizontally from said transmission and having their one ends adjacent the lower ends of said first group of rods, and a bell-crank lever for each of said first group of rods respectively connecting the lower ends thereof with the said one ends of said second group of rods, and another rod extending from said control means to said throttle.

9. In an automotive traction unit; a frame, an engine transversely arranged in said frame; an adjustable throttle and a variable speed transmission associated with said engine; centralized control means carried on said frame above and behind said engine and transmission and including a rock shaft pivoted on a transverse axis; a plurality of levers pivoted on said rock shaft; a plurality of bell-cranks pivoted on said engine; links connecting one of said levers with said throttle and the others thereof with one end of said bell-cranks; and other links connecting the other ends of said bell-cranks with said transmission.

10. In an automotive traction unit; a frame; an engine carried in said frame; a throttle and transmission for said engine; a centralized control means carried on said frame above and behind said engine and transmission and including a transverse rock shaft; a plurality of levers mounted on said rock shaft and including one extending into the driver's compartment and at least two having connection with said transmission; means for selectively engaging said one lever with either of the said two levers for adjusting said transmission by movements of said one lever; shafting extending axially through said one lever and traversing said rock shaft; a lever on the end of said shafting having a connection with said throttle; and means for rotating said shafting from the free end of said one lever.

11. In combination in a traction unit; a frame; an engine carried in said frame and having a throttle and a transmission; control means for said throttle and transmission mounted in said frame and having a transverse shaft; a pair of vertical hand levers pivoted on said shaft; a pair of bell-cranks pivoted on said shaft; means for selectively engaging one of said hand levers with either of said bell-cranks; linkages connecting said bell-cranks with said transmission for selection of speeds and directions of drive, and said other lever with said transmission for selection of high-low speed range; and throttle control means comprising shafting extending axially through said one lever and traversing said shaft, said shafting being connected with said throttle; and a hand grip on the free end of said one lever for shifting the same and connected with said shafting.

ROBERT C. WALLACE.

REFERENCES CITED

The following references are of record in the file of this patent:

UNITED STATES PATENTS

| Number | Name | Date |
|---|---|---|
| 1,819,688 | Moore | Aug. 18, 1931 |
| 1,823,622 | Mitchell | Sept. 15, 1931 |
| 1,861,394 | Hoover | May 31, 1932 |
| 1,897,537 | Sullivan et al. | Feb. 14, 1933 |
| 1,953,539 | Neal | Apr. 3, 1934 |
| 2,039,093 | Lewis | Apr. 28, 1936 |